Nov. 29, 1960    G. W. JACKSON ET AL    2,962,296
FLUID SUSPENSION AND CONTROL SYSTEM THEREFOR
Original Filed June 18, 1956
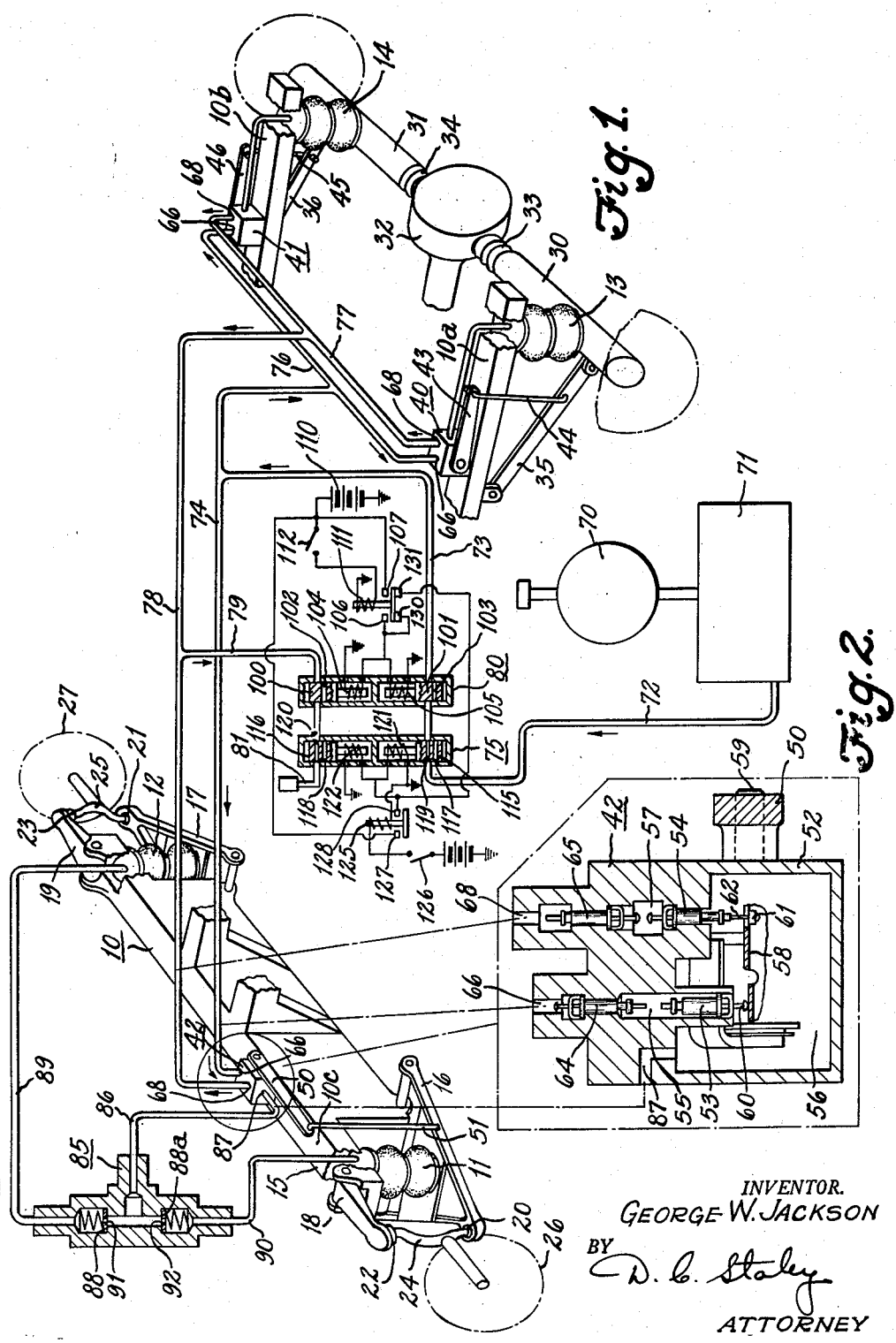
INVENTOR.
GEORGE W. JACKSON
BY
D. C. Staley
ATTORNEY

United States Patent Office 2,962,296
Patented Nov. 29, 1960

2,962,296

FLUID SUSPENSION AND CONTROL SYSTEM THEREFOR

George W. Jackson, Dayton, Ohio, and John T. Hoban, Detroit, Mich., assignors to General Motors Corporation, Detroit, Mich., a corporation of Delaware Continuation of application Ser. No. 592,152, June 18, 1956. This application Jan. 6, 1958, Ser. No. 707,341

23 Claims. (Cl. 280—124)

This invention relates to a fluid suspension system for a motor vehicle and to a control system for the same.

This application is a continuation of application S.N. 592,152 filed June 18, 1956, now abandoned, of George W. Jackson and John T. Hoban.

The present invention is particularly adapted for use on a motor vehicle having a suspension system in which an expansible fluid spring, or expansible bellows is used to provide the resilient means for supporting the chassis of a vehicle on the axles. A fluid spring of the expansible bellows type is adapted to have the pressure of the fluid varied within the spring in response to load conditions on the chassis whereby to maintain a relatively constant clearance height between the chassis and the axle of the vehicle irrespective of the load that is carried by the chassis.

To provide for a change in fluid pressure in the expansible fluid spring, or bellows, fluid control valves are provided to respond to a change in clearance height between the axle and the chassis of the vehicle so that if the chassis of the vehicle tends to decrease the clearance height as a result of increase of load in the vehicle, the control valve will provide for an additional supply of pressure to the air spring to offset the increase in load and thereby maintain a relatively constant clearance height between the chassis and the axle. When the load on the chassis decreases, the reverse condition occurs under control of the valve whereby fluid pressure is exhausted from the air spring to permit the chassis to return to the predetermined clearance height relative to the axle.

It is an object of this invention to provide a control system for a fluid spring or pneumatic suspension unit that is adapted to effect reestablishment of a predetermined clearance height between the axle and chassis of a vehicle at one response rate under one condition of operation of the vehicle and to effect the re-establishment of a predetermined clearance height at a different response rate under other conditions of operation of the vehicle.

It is another object of the invention to provide a control system for supplying fluid to and exhausting fluid from an expansible fluid spring for a motor vehicle that includes fluid control means responsive to a change in clearance height between the axle and chassis of the vehicle to effect correction of the clearance height, the fluid control means being in fluid flow relationship with flow control valves that have one position to provide for restrictive flow of fluid to and from the air springs for slow response of height correction and a second position to provide for relatively unrestricted flow to and from the air springs to effect a rapid response to height correction.

It is another object of the invention to provide actuating controls for the valves of the aforementioned object wherein one of the controls renders a valve effective in its unrestricted flow position upon closing of an ignition switch for the vehicle and the other valve is shifted between one position of restrictive flow to another position of unrestricted flow in response to operation of a door actuated switch.

Still another object of the invention is to provide a fluid suspension system and controls for the same wherein each of the fluid springs between an axle and a chassis provides independent suspension between independently movable axles and the chassis.

Further objects and advantages of the present invention will be apparent from the following description, reference being had to the accompany drawings wherein a preferred form of the invention is clearly shown.

In the drawings:

Figure 1 is a schematic illustration of an air suspension system and controls for the same incorporating features of this invention.

Figure 2 is an enlarged cross sectional view of a fluid control valve for supplying air to and exhaust of air from an air spring.

In this invention the chassis 10 of a vehicle is supported by expansible fluid springs 11, 12, 13 and 14. The fluid springs 11 and 12 are disposed between a front cross frame member 15 and the lower control arms 16 and 17 respectively of a front end suspension that includes the aforementioned control arms and upper control arms 18 and 18 that are also pivotally connected with the cross frame member 15. The control arms 16 and 17 have spherical joints 20 and 21 while the upper control arms 18 and 19 have corresponding spherical joints 22 and 23 providing support for the steering knuckles 24 and 25 respectively that carry the front wheels 26 and 27.

The front end control arm arrangement of the wheel suspension heretofore described is relatively conventional, but differs in that the expansible air springs 11 and 12 replace the steel coil springs that are conventionally used in arrangements of the type illustrated.

The air springs 13 and 14 are carried between the rear axles 30 and 31 that are independently supported on a differential housing 32 by means of joints 33 and 34 that permit vertical movements of the axles 30 and 31 relative to the differential 32 and relative to the chassis 10. Drag links 35 and 36 are provided between the chassis frame members 10a and 10b and the rear axles 30 and 31 respectively. The expansible fluid springs 13 and 14 are thus supported between the independently movable rear axles 30 and 31 and the chassis frame members.

The expansible springs 11, 12, 13 and 14 contain fluid under pressure, preferably air, maintained at a predetermined pressure to establish a predetermined clearance height between the vehicle axles and the chassis frame, and thereby establish a predetermined clearance height between the chassis frame and the ground. If the load increases upon the chassis, the fluid springs 11, 12, 13 and 14 are compressed to a reduced height, thus reducing the clearance height between the chassis and the axles and thereby between the chassis and the ground. To offset the increase in load and reestablish the predetermined clearance height, fluid under pressure, preferably air, is delivered into the fluid springs to restore the predetermined clearance height between the chassis and the axles. When a load is removed from the vehicle, the reverse action occurs by exhausting fluid from the air springs.

To accomplish this result, fluid flow control valves 40, 41 and 42 are provided. The control valves 40 and 41 are carried on the chassis frame members 10a and 10b adjacent the fluid springs 13 and 14. The valves 40 and 41 are provided with an operating lever 43 and 46 respectively that connects either with the axles 30 and 31, or as specifically illustrated with the drag links 35 and 36 through the links 44 and 45 respectively, whereby the actuating levers 43 and 46 are adapted to operate air supply and exhaust valve elements within the control valves 40 and 41 to effect supply of air under pressure to the air springs 13 and 14 or exhaust air from the air springs.

Similarly, the control valve 42 carried on the front suspension frame member 10c is provided with an actuating lever 50 that connects with a lower control arm 16 by means of a link 51 whereby vertical movement of the control arm 16 effects operation of valve elements within the control valve 42 to provide for supply of air under pressure to the front air spring units 11 or 12 or exhaust of air from these units.

The control valves 40, 41 and 42 are of identical construction more particuluarly illustrated in Figure 2 wherein the control valve 42 is illustrated in cross section.

The valve 42 has a valve body 52 that contains a pair of valve elements 53 and 54 that are of a construction comparable to a conventional tire valve. The valve element 53 permits inlet flow of air through the inlet passage 55 for delivery into the housing chamber 56 while the valve element 54 provides for exhaust of air from the housing chamber 56 into the exhaust passage 57. The valve elements 53 and 54 are operated by an arm 58 that moves vertically relative to the valve elements 53 and 54 as effected by rotation of the actuating lever 50 on its axis 59. Upward movement of the arm 58 engages the valve extension 60 of the valve element 53 to open the valve 53 to allow air to pass into the chamber 56. Downward movement of the arm 58 effects engagement with the head enlargement 61 on the valve extension 62 of the valve element 54 to open the valve and allow exhaust of air from the chamber 56.

Valve elements 64 and 65 are check valve elements of a construction similar to a conventional tire valve, and thus are of the same general construction as the valve elements 53 and 54. The valve element 64 permits free flow of air under pressure through the inlet port 66 into the inlet passage 55. Similarly, valve element 65 permits free flow of air from the exhaust passage 57 into the exhaust port 68. The valve element 64 cooperates with the valve element 53 to provide for the free flow of air under pressure into the chamber 56 when the valve element 53 is opened, otherwise valve element 64 operates as a check valve in the inlet passage 55 for reasons hereinafter described. Similarly, valve element 54 cooperates with valve element 65 to provide for free flow of exhaust of air from the chamber 56 when the valve element 54 is open, valve element 65 functioning as a check valve to prevent flow of air under pressure from the exhaust port 68 into the passage 57 in a manner also to be hereinafter referred to.

Air is placed under pressure by means of a compressor 70 that delivers its pressure exhaust into the pressure chamber 71. The pressure chamber 71 is connected by a conduit 72 with a pair of fluid control means 75 and 80 being placed in series flow relationship so that air under pressure supplied to the control member 75 through the pressure conduit 72 flows through that control member and through the control member 80 into the pressure supply conduit 73. The conduit 73 supplies air under pressure into the conduit 74 and thence into the conduit 76 that connects with both control valves 40 and 41 for supplying air under pressure to the rear axle positioned air springs 13 and 14. The conduit 76 thus interconnects the inlet ports 66 of the respective control valves 40 and 41. The conduit 74 also supplies air under pressure to the air inlet port 66 of the respective control valves 40 and 41. The conduit 74 also supplies air under pressure to the air inlet port 66 of the control valve 42 that supplies air under pressure to the front axle positioned fluid springs 11 and 12.

A conduit 77 interconnects the exhaust ports 68 of the control valves 40 and 41 and also connects with the exhaust port 68 of the control valve 42 through the conduit 78. A conduit 79 connects the exhaust line 78 with the fluid control means 80 which is in series flow arrangement with the control means 75 so that fluid exhausted through the conduits 77, 78 and 79 will exhaust to atmosphere through the conduit 81.

A combination check and resistance valve 85 is provided between the control valve 42 and the front axle positioned fluid springs 11 and 12. This valve 85 has a conduit 86 that connects with the outlet port 87 of the control valve 42 so that air can be supplied to or exhausted from the fluid springs 11 and 12. Check valves 88 andn 88a are provided in the valve 85 in the conduit lines 89 and 90 respectively so as to provide for free flow of air from the conduit 86 into the conduits 89 and 90 and thus free flow of air into the fluid springs 11 and 12.

The check valves 88 and 88a are provided with resistance passages 91 and 92 that prevent free flow of exhaust of air from the air springs 11 and 12, and thus provide for a restrictive flow of air intercommunicating between the conduits 89 and 90 and thus between the air springs 11 and 12. The arrangement is such that a rapid correction for clearance height can be made by delivery of air into the springs 11 and 12, but when the chassis 10 tends to change its attitude relative to the ground, as when negotiating a curve, the air compressed in one air spring 11 or 12, depending on which air spring is on the outboard side of the curve, will not be freely transferred, to the opposite air spring as would be occasioned if the resistance passages 91 and 92 were not provided in the check valves 88 and 88a. This resistance to interflow of air between the air springs 11 and 12 tends to stabilize the car during the period of negotiation of curves.

The fluid control valve 80 as placed in the air pressure supply line 72 and the exhaust line 79 has two slide valve elements 100 and 101. The slide valves 100 and 101 have through passages 102 and 103 respectively that are adapted to align with the exhaust conduit 79 and the inlet conduit 73 when the electric solenoids 104 and 105 respectively are energized.

When the solenoids 104 and 105 are deenergized the slide valves 100 and 101 are in the position illustrated in the drawing in which the exhaust line 79 and the inlet line 72—73 are closed off from fluid flow through these lines.

The solenoids 104 and 105 are electrically connected through the relay contacts 106 and 107 with a battery 110. The relay 111 that is energized when an ignition switch 112 is closed causes bridging of the contacts 106 and 107 to energize the solenoids 104 and 105 to shift them from the position illustrated in the drawing to a position in which the passage 102 is aligned with the conduit 79 and the passage 103 is aligned with the conduit 73 to provide full flow of fluid through the valve 80 whenever the ignition switch 112 is closed.

The fluid control valve 75 has two slide valve elements 115 and 116. These elements have full fluid flow passages 117 and 118 respectively and resistance flow passages 119 and 120 respectively.

The slide valves 15 and 116 are operated by electric solenoids 121 and 122 respectively to shift them from a position in which the resistance passages 119 and 120 are aligned with the inlet conduit 72 and the exhaust conduit 79 to a position in which the full flow passages 117 and 118 are aligned with the inlet conduit 72 and the exhaust conduit 79 respectively.

The shifting of the valve elements 115 and 116 is occasioned by a relay 125 energized by a door actuated switch 126, the relay 125 closing upon the contacts 127 and 128 to energize the solenoids 121 and 122, which energization effects movement of the slide valves 115 and 116 to align the full flow passages 117 and 118 with the inlet conduit 72 and the exhaust conduit 79 respectively.

Under conditions of operation wherein the vehicle is idle, under which conditions the ignition switch 112 is open, and the doors of the vehicle are closed resulting in opening of the door operated switch 126, the valve members 75 and 80 will be in the positions illustrated in the drawing so that the valve elements 100 and 101 prevent flow of fluid to the air springs 11, 12, 13 and 14 or exhaust of fluid from the air springs regardless of any demand for supply of air or exhaust of air by the control valves 40, 41 and 42. In other words, the height correction system is inactive at this time.

When the engine of the vehicle is operating, that is when the ignition switch 112 is closed, the valve 80 will have the solenoids 104 and 105 energized to shift the passages 102 and 103 of the valve elements into alignment with the exhaust line 79 and the inlet line 72—73. At this time, if the door actuated switch 126 is open, indicating all doors of the vehicle being closed, the resistance passages 119 and 120 of the valve 75 are aligned with the exhaust line 79 and the inlet line 72 so that only a small controlled volume of air can pass to the air springs 11, 12, 13 and 14 or exhaust from the air springs as called for by the control valves 40, 41 and 42. Under this condition the response of the leveling system to variations in height clearance is slow. This has the advantage that rapid oscillations of the axles 30, 31, 16, 17 will not cause any rapid change in height clearance between the chassis and the axles, or the ground. Thus when the vehicle is moving over rough road conditions, the restricted flow of air allowed to flow into the air springs or exhaust from the air springs will maintain relatively constant the predetermined clearance height between the chassis and the ground. However, should there be leakage in the air springs, or the conduit system serving the air springs, resulting in a gradual settling of the chassis relative to the ground or the axles, the control valves 40, 41 and 42 will return the chassis to the predetermined clearance height relation.

The delayed or slow responds heretofore described that is effective during normal road operation of the vehicle would, on occasion of change of load condition in the vehicle represented by an increase or decrease of passengers, be too slow in responding to a quick change of load with the result that the chassis would either settle or rise from the predetermined height relation. Under this condition, when a door of the vehicle is opened the switch 126 is closed thereby energizing the relay 125 so as to energize solenoids 121 and 122 of the valves 75 to shift the valve elements 115 and 116 to align the free flow passages 117 and 118 with the inlet line 72 and the exhaust line 79 respectively. Under this condition of operation the valves 75 and 80 allow a substantially unrestricted flow of air to the control valves 40, 41 and 42 or exhaust of air therefrom, resulting in a rapid response for height correction.

Should the engine of the vehicle be inactive, with the result that the ignition switch 112 is open, when the door switch 126 is closed for loading of passengers, the relay 111 will be bridging the contacts 130 and 131 so that the solenoids 104 and 105 of the valve 80 will also be energized to shift the valve elements 100 and 101 from the position shown in the drawing to align the passages 102 and 103 with the inlet conduit 72—73 and the exhaust line 79 respectively. This will result in providing for a rapid response to height correction during a period of loading of the vehicle with the engine inoperative.

As previously stated herein valve elements 64 and 65 are check valve elements that prevent flow of air from the chamber 55 to the passage 66 on the inlet side of the respective height control valves 40, 41 and 42 whereas the check valve 65 prevents flow of air from the passage 68 into the chamber 57 of the respective height control valves. Since all of the control valves 40, 41 and 42 are of identical construction as illustrated in Fig. 2 it will be appreciated that each of the valves 40, 41 and 42 have the respective check valves 64 and 65 in the inlet and exhaust passages of the several valves.

It will thus be apparent that under an occasion wherein the valves 40 and 41 both call for exhaust of air simultaneously from the air springs 13 and 14 respectively the respective check valves 65 of the control valves 40 and 41 will prevent a transfer of air from one air spring to the other. For example, should the car be more heavily loaded on one side than the other, for example, the left side, the air spring 13 would normally have a higher internal air pressure than the air spring 14 to maintain the chassis of the vehicle at a level condition. Thus, when the automobile is decelerated at a rapid rate, such as during braking, and the rear end of the automobile tends to rise due to the braking action, both air springs 13 and 14 would expand with the result that the control valves 40 and 41 would have the exhaust valves 54 of the respective controls open simultaneously. Under this condition, with higher pressure existing in the air spring 13 than in the air spring 14 there would tend to be a cross flow of air under pressure from the air spring 13 to the air spring 14 and balance the pressure in the springs during this period of braking deceleration of the vehicle so that when the vehicle would return to its previous condition, on settling after the braking action, the air pressure in the air spring 13 would be less than required to support the heavy load on that side of the car whereas the air pressure in the air spring 14 would be too great to support the lighter load on that side of the car, thus positioning the car in an incorrect attitude angular to the horizontal. The check valves 65 in the exhaust passages of the control valves 40 and 41 prevent this cross flow of air between the air springs during this abnormal period so that when the vehicle settles to its normal position the air pressure ratio between the air springs 13 and 14 will not have been disturbed, even though some air may have been lost from both air springs during the deceleration of the vehicle as occasioned by opening of the exhaust valves, the quantity of air exhausted from the air springs will have been in proportion to the pressure in the air springs so that level condition of the loaded vehicle will not alter when the deceleration period is ended.

A similar condition can occur when the vehicle enters a curve wherein, for example, the right side of the vehicle tends to compress the springs 12 and 14 while the air springs 11 and 13 tend to expand due to the roll of the vehicle body. Under this circumstance the control valves 42 and 40 would tend to call for exhaust of air from the air springs 11 and 13 with the result that there would be a tendency of cross flow of air between the air springs 11 and 13 since both exhaust valves 54 of the respective control valves 42 and 40 would be open. The check valves 65 of the respective control valves 42 and 40 will prevent this cross flow of air between the front air spring and the rear air spring 11 and 13 respectively so there can be no change in the level position of the body relative to the axle when the roll condition is completed.

This condition exists primarily in view of the resistance 120 preventing full flow of exhaust of air from the conduit 78 with the result that there is a temporary restrictive flow in the conduit 78 at the time the exhaust valves of the control valves 40 and 41 or the valves 42 and 40 are open simultaneously under the conditions heretofore described, the restrictive flow to the exhaust of air tending to set up the condition under which cross flow of air heretofore described can occur between the air springs. The check valves 65 in the exhaust passages of the several control valves prevent this cross flow of air under the aforementioned conditions and therefore tends to prevent any change in the air pressure ratio relationships between the several air springs to support the load in the vehicle in accordance with its distribution within the vehicle.

The check valves 64 in the inlet chambers 55 of the control valves 40, 41 and 42 are provided to prevent loss of air from the respective air springs under a condition wherein air pressure in the reservoir 71 has been lost. Should this event occur and any one of the valves 40, 41 or 42 open the respective inlet valve 53, air would discharge from the air spring through the now open inlet valve. Check valves 64 prevent the loss of air from the air springs on happening of this event.

While the form of embodiment of the invention as herein disclosed constitutes a preferred form, it is to be understood that other forms might be adopted as may come within the scope of the claims which follow.

What is claimed is as follows:

1. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation, and a second fluid control means having one position providing for restricted flow of fluid to and from said first fluid control means to effect slow response of correction of height relation and a second position providing for relatively unrestricted flow of fluid to and from said first fluid control means to effect rapid response of correction of height relation, and third fluid control means having one position providing for relatively unrestricted flow of fluid to and from said first and second fluid control means and second position to cut off such flow.

2. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation, and a second fluid control means having one position providing for restricted flow of fluid to and from said first fluid control means to effect slow response of correction of height relation and a second position providing for relatively unrestricted flow of fluid to and from said first fluid control means to effect rapid response of correction of height relation, third fluid control means having one position providing for relatively unrestricted flow of fluid to and from said first and second fluid control means and second position to cut off such flow, and an actuating control for said second control means having one position effective to position said second fluid control in its said second position and said third fluid control in its said one position, said actuating control having a second position to position said second fluid control in its said one position and render said third fluid control effective in its position for cut off of fluid flow.

3. Control apparatus for regulation of the supply and exhaust of fluid to and from an expansible fluid spring for a motor vehicle to maintain a regulated clearance height between the sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation, and a second fluid control means having one position providing for restricted flow of fluid to and from said first fluid control means to effect slow response of correction of height relation and a second position providing for relatively unrestricted flow of fluid to and from said first fluid control means to effect rapid response of correction of height relation, third fluid control means having one position providing for relatively unrestricted flow of fluid to and from said first and second fluid control means and second position to cut off such flow, an actuating control for said second control means having one position effective to position said second fluid control in its said second position and said third fluid control in its said one position, said actuating control having a second position to position said second fluid control in its said one position and render said third fluid control effective in its position for cut off of fluid flow, and a second actuating control for said third fluid control having one position effective to position said third fluid control in its said one position and a second position to render said third fluid control effective in its fluid cut off position.

4. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation, and a second fluid control means having one position providing for restricted flow of fluid to and from said first fluid control means to effect slow response of correction of height relation and a second position providing for relatively unrestricted flow of fluid to and from said first fluid control means to effect rapid response of correction of height relation, third fluid control means having one position providing for relatively unrestricted flow of fluid to and from said first and second fluid control means and second position to cut off such flow, an actuating control for said second fluid control responsive to movement of a door of a vehicle and effective when the door is open to position said fluid control in its said second position concurrently with placing said third fluid control in its said one position to provide for relatively unrestricted flow of fluid to and from said first fluid control for rapid response of correction of height relation between the sprung mass and the unsprung mass of the vehicle.

5. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation, and a second fluid control means having one position providing for restricted flow of fluid to and from said first fluid control means to effect slow response of correction of height relation and a second position providing for relatively unrestricted flow of fluid to and from said first fluid control means to effect rapid response of correction of height relation, third fluid control means having one position providing for relatively unrestricted flow of fluid to and from said first and second fluid control means and second position to cut off such flow, an actuating control for said second fluid control responsive to movement of a door of a vehicle and effective when the door is open to position said fluid control in its said second position concurrently with placing said third fluid control in its said one position to provide for relatively unrestricted flow of fluid to and from said first fluid control for rapid response of correction of height relation between the sprung mass and the unsprung mass of the vehicle, and effective when the door is closed to position said second fluid control in its said one position and said third fluid control in its said second position whereby to prevent a change in height relation.

6. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation, and a second fluid control means having one position providing for restricted flow of fluid to and from said first fluid control means to effect slow response of correction of height relation and a second position providing for relatively unrestricted flow of fluid to and from said first fluid control means to effect rapid response of correction of height relation, third fluid control means having one position providing for relatively unrestricted flow of fluid to and from said first and second fluid control means and second position to cut off such flow, an actuating control for said second fluid control responsive to movement of a door of a vehicle and effective when the door is open to position said fluid control in its said second position concurrently with placing said third fluid control in its said one position to provide for relatively unrestricted flow of fluid to and from said first fluid control for rapid response of correction of height relation between the sprung mass and the unsprung mass of the vehicle, and effective when the door is closed to position said second fluid control in its said one position and said third fluid control in its said second position whereby to prevent a change in height relation, and a second actuating control for said third fluid control effective upon closing of the ignition switch of the vehicle to position said third fluid control in its said one position whereby to provide for slow response of correction of height relation between the sprung mass and the unsprung mass of the vehicle.

7. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, and fluid flow regulating means between said additional fluid control means and said front axle positioned springs providing continuously for free flow of fluid to the springs and restricted flow from the springs.

8. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned spring responsive to a change in clearance height at one side of the chassis to effect correction of height relation at both front axle positioned springs, fluid flow regulating means between said additional fluid control means and said front axle positioned springs providing for free flow of fluid to the springs and restricted flow from the springs, said fluid flow regulating means comprising unidirectional flow check valve means between said additional fluid control means and said front axle positioned springs providing for free flow of fluid to the springs, said check valve means including a resistance passage bypassing the check valve for restrictive flow of fluid from the springs.

9. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, and fluid flow regulating means between said additional fluid control means and in said front axle positioned springs comprising check valve means providing for free flow of fluid to the springs and fluid interconnecting said springs, said check valve means including a resistance flow passage bypassing the check valve to effect restricted interflow between the springs.

10. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, fluid flow regulating means between said additional fluid control means and said front axle positioned springs providing for free flow of fluid to the springs and restricted flow from the springs, and valve means at each of said fluid control means providing for free flow of fluid to and from each of the said control means from a supply source and to exhaust and prevent interflow of fluid between the springs.

11. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, fluid flow regulating means between said additional fluid control means and said front axle positioned springs providing for free flow of fluid to the springs and restricted flow from the springs, each of said fluid control means having a first set of valves openable to provide for inlet and exhaust of fluid to and from the fluid spring controlled thereby and a second set of unidirectional flow check valves in series with said first set of valves providing for free flow of fluid supply and exhaust of fluid to and from the springs and preventing interflow of fluid between the springs.

12. Control apparatus for regulation of a supply and exhaust of fluid to and from an expansible fluid spring for a motor vehicle to maintain the regulated clearance height between the chassis and the axles of a vehicle, comprising, expansible fluid springs positioned at each side of a chassis between the chassis and independently movable rear axles of the vehicle and also positioned at each side of the chassis between the same and independently movable front axles of the vehicle, fluid control means for each rear axle positioned spring responsive to a change in clearance height relation between the chassis and the axle at the respective springs to effect correction of height relation at the respective spring, additional fluid control means for the front axle positioned springs responsive to a change in clearance height at one side of the chassis to effect correction of height relation at both front axle positioned springs, and fluid flow regulating means between said additional fluid control means and said front axle positioned springs through which fluid flows to and from the springs and interconnects the springs, said regulating means providing continuously for free flow of fluid to the front axle positioned springs and restrictive flow from the springs.

13. Control apparatus for regulation of a supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also position at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, a source of fluid pressure, conduit means connecting said source with each of said fluid control means, other conduit means connecting the said control means with exhaust, valve means in each of said control means providing for free flow of fluid to and from the control means but preventing interflow of fluid between the fluid springs regulated by the control means, and fluid flow regulating means between said additional fluid control means and said front axle positioned springs providing for free flow of fluid to the springs and restricted interconnection flow between the springs.

14. Control apparatus for regulation of a supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also position at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, a source of fluid pressure, conduit means connecting said source with each of said fluid control means, other conduit means connecting the said control means with exhaust, valve means in each of said control means providing for free flow of fluid to and from the control means but preventing interflow of fluid between the fluid springs regulated by the control means, fluid flow regulating means between said additional fluid control means and said front axle positioned springs providing for free flow of fluid to the springs and restricted interconnection flow between the springs, a first control valve in said conduits having one position providing for restricted flow of fluid to and from said fluid control means to effect slow response of correction of height relation and a second position providing for relatively unrestricted flow of fluid to and from said fluid control means to effect rapid response of correction of height relation, and a second control valve in said conduits in series relation with said first valve having one position providing for unrestricted flow of fluid through the first valve and a second position to cut off such flow.

15. Control apparatus for regulation of a supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also position at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, a source of fluid pressure, conduit means connecting said source with each of said fluid control means, other conduit means connecting the said control means with exhaust, valve means in each of said control means providing for free flow of fluid to and from the control means but preventing interflow of fluid between the fluid springs regulated by the control means, fluid flow regulating means between said additional fluid control means and said front axle positioned springs providing for free flow of fluid to the springs and restricted interconnection flow between the springs, a first control valve in said conduits having one position providing for restricted flow of fluid to and from said control means to effect slow response of correction of height relation and a second position providing for relatively unrestricted flow of fluid to and from said fluid control means to effect rapid response of correction of height relation, and a second control valve in said conduits in series relation with said first valve having one position providing for unrestricted flow of fluid through the first valve and a second position to cut off such flow, an actuating control for said valves having one position effective to position both said valves in their unrestricted flow position and a second position to position said first valve in its restrictive flow position and said second valve in its cut off position.

16. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height relation at both front axle positioned springs, a source of fluid pressure, conduit means connecting said source with each of said fluid control means, other conduit means connecting the said control means with exhaust, valve means in each of said control means providing for free flow of fluid to and from the control means but preventing interflow of fluid between the fluid springs regulated by the control means, fluid flow regulating means between said additional fluid control means and said front axle positioned springs providing for free flow of fluid to the springs and restricted interconnection flow between the springs, a first control valve in said conduits having one position providing for restricted flow of fluid to and from said control means to effect slow response of correction of height relation and a second position providing for relatively unrestricted flow of fluid to and from said fluid control means to effect rapid response of correction of height relation, and a second control valve in said conduits in series relation with said first valve having one position providing for unrestricted flow of fluid through the first valve and a second position to cut off such flow, an actuating control for said valves having one position effective to position both said valves in their unrestricted flow position and a second position to position said first valve in its restrictive flow position and said second valve in its cut off position, and a second actuating control effective only on said second valve to position it in its unrestricted flow position or cut off position.

17. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, and valve means at each of said fluid control means providing for free flow of fluid to and from each of the said control means from a supply source and to exhaust and preventing interflow of fluid between the springs through the respective fluid control means for the same.

18. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of a chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, each of said fluid control means having a first set of valves openable to provide for inlet and exhaust of fluid to and from the fluid spring controlled thereby and a second set of unidirectional flow check valves in series flow arrangement with said first set of valves providing for free flow of fluid supply and exhaust of fluid to and from the springs and preventing interflow of fluid between the springs through the respective fluid control means for the same.

19. Control apparatus for regulation of the supply and exhaust of fluid to and from expansible fluid springs for a motor vehicle to maintain a regulated clearance height between the chassis and the axles of the vehicle, comprising, expansible fluid springs positioned at each side of the chassis between the chassis and a rear axle of the vehicle and also positioned at each side of the chassis between the same and a front axle of the vehicle, fluid control means for each rear axle positioned spring responsive to a change in clearance height relation between the chassis and the axle at the respective spring to effect correction of said height relation, additional fluid control means for the front axle positioned springs responsive to a change in clearance height at one side of the chassis to effect correction of height relation at both front axle positioned springs, a source of fluid pressure, conduit means connecting said source with each of said fluid control means, other conduit means connecting the said control means with exhaust, resistance means in said other conduit means restricting exhaust flow of fluid from said springs that are under regulation of said additional control means, and valve means in each of said control means providing for free flow of fluid through the control means to and from the air springs under regulation of their respective control means but preventing interflow of fluid between the said rear fluid springs and between the said rear and front fluid springs through their respective control means.

20. Control apparatus for regulation of the supply and exhaust of fluid to and from expansible fluid springs for a motor vehicle to maintain a regulated clearance height between the sprung mass and the unsprung mass of the vehicle, comprising, a plurality of fluid springs positioned between the sprung mass and the unsprung mass of the vehicle, a plurality of fluid control means for the several fluid springs independently controlling flow of fluid to and from the fluid springs in response to a change in clearance height relation between the sprung mass and the unsprung mass of the vehicle to effect correction of height relation, a source of fluid pressure, conduit means connecting said source with each of said fluid control means and providing thereby a source of fluid pressure for delivery to said fluid springs under control of said fluid control means, other conduit means common to all of the control means and connecting the control means with exhaust to provide for exhaust of fluid from the fluid springs under independent regulation of the said control means, resistance means in said other conduit means restricting exhaust flow of fluid from said springs that are under regulation of the said control means, valve means in each of the said control means providing for free flow of fluid through the control means to and from the said springs under regulation of the control means, and other valve means in the said control means preventing interflow of fluid between the said rear fluid springs and between said rear and front fluid springs through their respective control means during exhaust of fluid from the springs under regulation of the control means.

21. Control apparatus for regulation of the supply and exhaust of fluid to and from expansible fluid springs for a motor vehicle to maintain a regulated clearance height between the sprung mass and the unsprung mass of the vehicle, comprising, a plurality of fluid springs positioned between the sprung mass and the unsprung mass of the vehicle, a plurality of fluid control means for the several fluid springs independently controlling flow of fluid to and from the fluid springs in response to a change in clearance height relation between the sprung mass and the unsprung mass of the vehicle to effect correction of height relation, a source of fluid pressure, conduit means connecting said source with each of said fluid control means and providing thereby a source of fluid pressure for delivery to said fluid springs under control of said fluid control means, other conduit means common to all of the control means and connecting the control means with exhaust to provide for exhaust of fluid from the fluid springs under independent regulation of the said control means, resistance means in said other conduit means restricting exhaust flow of fluid from said springs that are under regulation of the said control means, valve means in each of the said control means providing for free flow of fluid through the control means to and from the said springs under regulation of the control means, and other valve means in the said control means preventing inter-flow of fluid between the said rear fluid springs and between said rear and front fluid springs through their respective control means during exhaust of fluid from the springs under regulation of the control means, and still other valve means in said control means preventing exhaust of fluid from said air springs through the inlet valve means of said control means in the event of loss of fluid pressure in said source.

22. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung and the unsprung mass to effect correction of the height relation, and a second fluid control means having one position providing normally for restricted flow of fluid to and from said first fluid control means so long as said second fluid control means is in said one position to effect slow response of correction of height relation with the vehicle either standing still or in motion and a second position providing temporarily for relatively unrestricted flow of fluid to and from said first fluid control means so long as said second fluid control means is in said second temporary position to provide temporarily for rapid response of correction of height relation and control means effective to position said second fluid control means in said one position when the vehicle is moving or standing still and effective to position said second fluid control means in said second position only in response to manually controlled movement of a part of the vehicle.

23. Control apparatus for regulation of the supply and exhaust of fluid to and from an expansible fluid spring for a motor vehicle to maintain a regulated clearance height between a sprung mass and an unsprung mass of the vehicle, comprising, an expansible fluid spring supporting a sprung mass upon an unsprung mass, first fluid control means responsive to a change in height relation between the sprung mass and the unsprung mass to effect correction of the height relation and a second fluid control means having a first predetermined resistance flow passage means therein and a second relatively unrestricted flow passage means therein, said second control means being movable to one position rendering said first passage means effective normally for restricted flow of fluid to and from said first fluid control means to effect thereby slow response of correction of height relation and movable to a second position rendering said second passage means effective temporarily for temporary relatively unrestricted flow of fluid to and from said first control means to effect thereby rapid response of correction of height relation, and movable to a third position to cut off fluid flow through the same, and control means effective to position said second fluid control means selectively in any one of the said positions.

References Cited in the file of this patent
UNITED STATES PATENTS

| | | |
|---|---|---|
| 1,555,199 | Gouirand | Sept. 29, 1925 |
| 1,816,075 | Down | July 28, 1931 |
| 2,787,475 | Jackson | Apr. 2, 1957 |
| 2,809,051 | Jackson | Oct. 8, 1957 |